United States Patent [19]

Rusbach

[11] 3,958,904

[45] May 25, 1976

[54] BALL-AND-SOCKET JOINT

[75] Inventor: Maurice Rusbach, Vernier, Switzerland

[73] Assignee: Sarmac S.A., Carouge, Switzerland

[22] Filed: Mar. 25, 1975

[21] Appl. No.: 562,040

[30] Foreign Application Priority Data
Apr. 5, 1974 Switzerland.................... 4819/74

[52] U.S. Cl................................ 403/90; 248/181
[51] Int. Cl.² ........................................ F16C 11/10
[58] Field of Search ............ 403/90, 114, 125, 128, 403/129, 131; 248/181; 269/75

[56] References Cited
UNITED STATES PATENTS

| | | | |
|---|---|---|---|
| 717,024 | 12/1902 | Nellenbogen.......................... | 403/90 |
| 916,301 | 3/1909 | Greenlaw........................... | 403/114 |
| 1,290,830 | 11/1919 | DelFungo-Giera................. | 248/181 |
| 2,212,953 | 8/1940 | Popp et al............................ | 269/75 |
| 3,409,317 | 11/1968 | Richards............................. | 403/90 |

Primary Examiner—Andrew V. Kundrat
Attorney, Agent, or Firm—Young & Thompson

[57] ABSTRACT

The invention relates to a ball-and-socket joint comprising an upper jaw and a lower jaw, one arranged on one side of a median plane of a ball, and the other disposed on the other side of said plane, and a means for clamping these jaws to lock the joint in a required position, characterized in that it comprises: a part-spherical cup disposed between the upper jaw and the ball; a first guide means limiting displacement of this cup relatively to the upper jaw in a first central plane of symmetry of the ball; and a second guide means limiting displacement of this cup relatively ot the ball in a second central plane of symmetry of the ball, and in that this first and second plane of symmetry are at right-angles to each other.

15 Claims, 14 Drawing Figures

BALL-AND-SOCKET JOINT

The present invention relates to a ball-and-socket joint which may be used in particular in a large class of equipment requiring to be levelled before use.

In the majority of cases the level at which the equipment is set has to be maintained to enable the equipment to operate in different directions without further adjustment. The changes in the directions in which the equipment operates may range through 360° in the horizontal plane. To achieve this, the pivot supporting the equipment has to be displaced relatively to vertical and horizontal reference points. This supporting pivot is itself carried by a stand, or most frequently, by a tripod etc. mounted in some suitable manner on unlevel ground. The pivot may be associated with, for example, optical levelling apparatus, a theodolite, a rocket-launching cradle carriage, etc. In the last-mentioned case, the maintenance of the horizontal setting over a range of 360° obviates the need for adjusting slope for changing the aiming direction. One of the commonest methods permitting angular displacement in all planes for obtaining the required level involves the use of ball-and-socket joints which are of simple and robust construction and require little space as compared with other systems employing crossed-shaft, cardan, etc., arrangements.

To maintain the supported equipment at the level at which it has been set and to absorb the reaction forces to which it is subjected during its manipulation (adjustments to achieve change of direction), the ball of the ball-and-socket joint must be firmly locked in position between two jaws. In some constructions one of the jaws, and in other constructions, the ball itself is solidly connected to, or integral with, the tripod.

Although the ball system offers considerable advantages as regards simplicity, strength and the saving of space, it requires a certain number of manipulations for achieving, on a trial-and-error basis, the required level of the supporting pivot because the latter can be freely displaced angularly in all planes. This disadvantage results in considerable loss of time whether the control reading is based on a peripheral level or on two orthogonal levels.

An object of the present invention is to eliminate this disadvantage by inserting between the ball and one of the clamping jaws a guide means which enables the level-finding operation to be brocken down into two orthogonal displacement movements. This guide means thus renders it possible to adjust the levels in turn independently of each other, adjustment of one level not affecting the adjustment of the other; furthermore the guiding means prevents any movement that is not parallel to one of the levels. Although the system is primarily intended for use in the adjustment of levels, it may also be used in the control of co-ordinates, of gear boxes, of aircraft and other machines, or it may serve to provide an orthogonal reference in cases where supporting means are not level, etc.

A further object of the present invention is to provide a ball-and-socket joint comprising an upper jaw and a lower jaw, one arranged on one side of a median plane of a ball, and the other disposed on the other side of said plane, and a means for clamping these jaws to lock the joint in a required position, characterized in that it comprises: a part-spherical cup disposed between the upper jaw and the ball; a first guide means limiting displacement of this cup relatively to the upper jaw in a first central plane of symmetry of the ball; and a second guide means limiting displacement of this cup relatively to the ball in a second central plane of symmetry of the ball, and in that this first and second plane of symmetry are at right-angles to each other.

The annexed drawing illustrates, by way of example, some constructions of the ball-and-socket joint in accordance with the invention.

Figure 1:
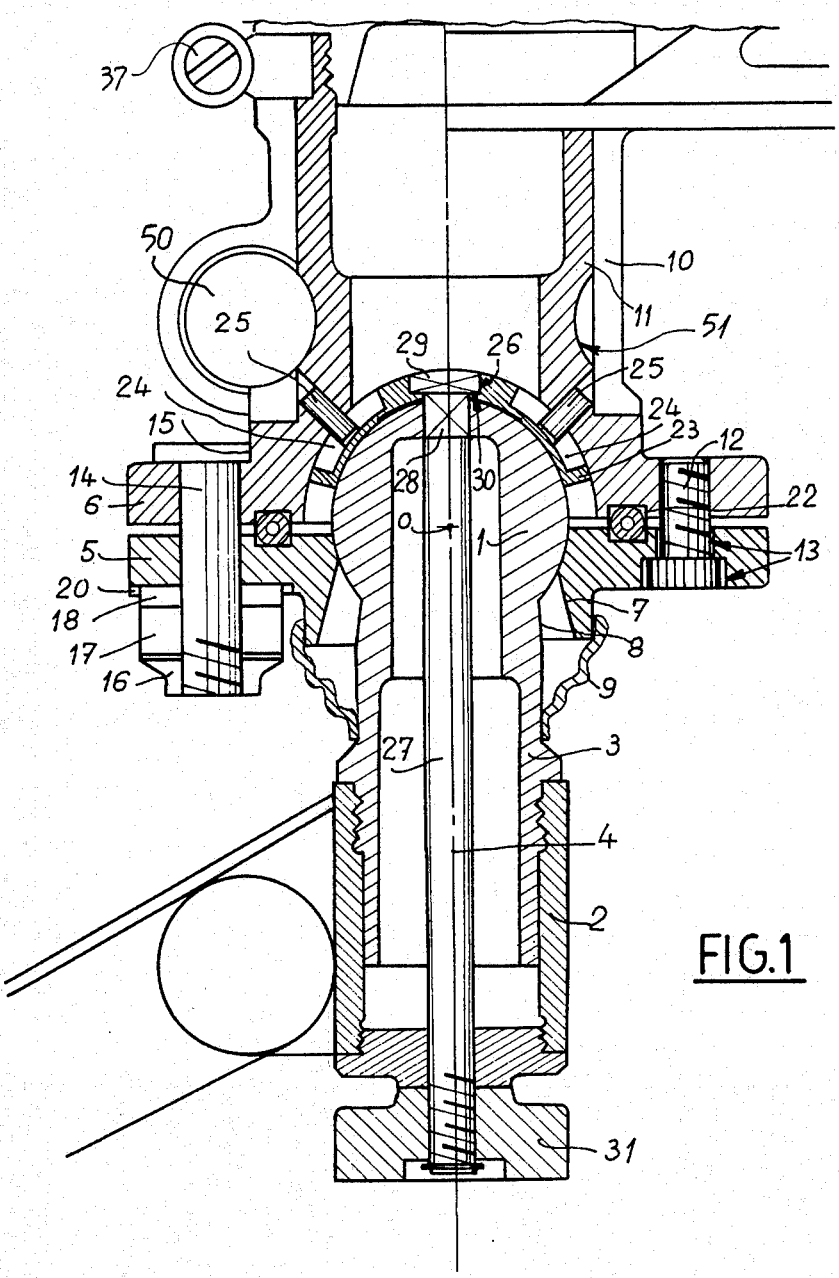
FIG. 1 is a sectional view of a first construction of the ball-and-socket joint.

In the first construction illustrated in FIG. 1, a ball 1 is secured to a stand or tripod 2 by a stem 3 integral with the ball. Since the stand or tripod is placed on uneven ground, the axis 4 of the stem is at an angle to the center $o$ of the ball 1. In the arrangement described, this axis is shown in the vertical position to facilitate reading of the drawing. The extent of the angular adjustment of said axis is limited to approximately 15°. Since the ground surface occupied is small it is always possible to find a small space which slopes less than 15°. This angular range can of course be increased or reduces in other constructions.

The ball 1 is gripped between two jaws 5 and 6. The lower jaw 5 has formed therein a circular recess, one part of which is part-spherical and the other part 7 of which is in the form of a cone having a total angle of 30° for enabling the stem 3 to be passed therethrough with some clearance. This clearance is angularly limited by the conical part 8 of the stem, which part forms a seat. In this condition the generatrices of the cones 7 and 8 coincide exactly. A bellows joint 9 made of rubber or other flexible material connects the jaw to the body of the stem so as to prevent foreign bodies, earth, dust etc. from reaching the ball. In this arrangement the upper jaw 6 comprises means for connecting the apparatus 10 to be supported, for example optical apparatus, a rocket-launching cradle, etc. These connecting means constitute the reference axis which takes the form of a bearing element whose shaft is formed by the cylindrical part 11 of the jaw 6. This arrangement enables the bearing element of the apparatus 10 to rotate through 360°. The two jaws are interconnected at one side by two shouldered screws 12 which are turned to leave a parallel-sided gap between the two jaws in the tightened position. In a way these screws act as a hinge having practically zero movement, the difference between tightening and loosening indicating the presence or otherwise of the tightening force. The existence of a certain degree of clearance 13 between the holes through the jaws and the cylindrical parts of the screws enables the jaw to be centered by the ball when the screws are tightened.

Figure 10:
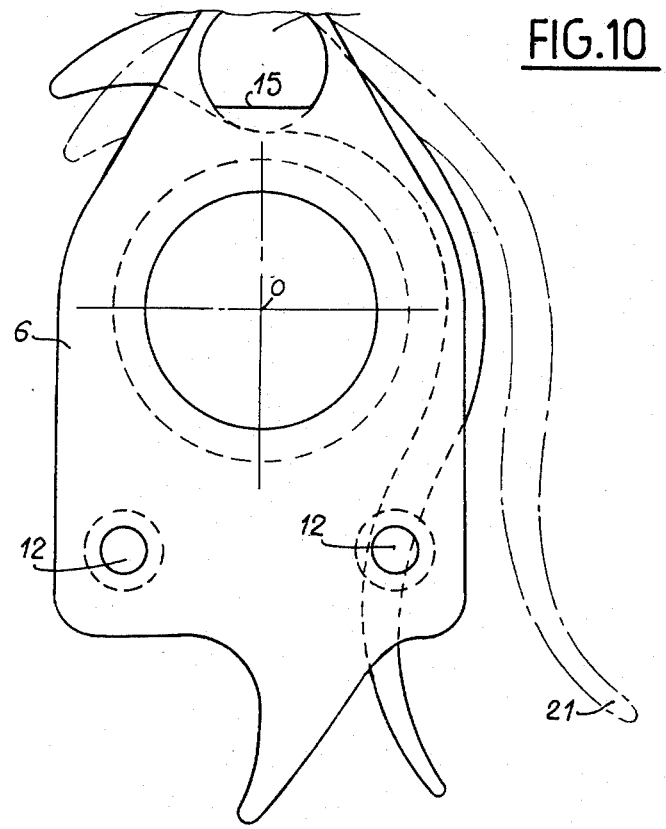
FIG. 10 illustrates the means for locking the joint in position.

At the other side the two jaws are interconnected by a spindle 14 which constitutes the clamping system. This spindle is prevented from rotating by a flat 15 formed on the head of the spindle and co-operating with the jaw 6. An adjusting nut 16 acts as a stop for a clamping arrangement comprising helicoidal inclined elements 17 and 18 provided with ratchet teeth. One of these elements, the element 18, part of which is fitted in a channel 20 in the jaw 5, is held against rotation. The moving element 17 is integral with a clamping lever 21 (FIG. 10). Rotation of the element 17 driven by the lever 21 causes clamping to take place by disengagement of the two sets of ratchet teeth. A ring 22 made of rubber or other synthetic material and of hollow or solid cross-section is fitted in circular channels machined in the jaws 5 and 6. This ring on the one hand serves as a packing preventing any harmful substance (e.g., liquid) from reaching the ball, and on the other hand performs the function of a resilient spacing element between the jaws when the clamping action on them is relaxed.

This ball-and-socket joint also comprises a hollow hemispherical cup 23 fitted between the ball and the likewise hemispherical inner surface of the jaw 6. The cup 23 has milled channels on orthogonal axes, these perpendicular axes intersecting at the polar point of the hemispherical cup. These channels co-operate with corresponding guide means associated with the jaw 6 and the ball 1. Milled on the same axis in the outer face of the cup 23 are two channels 24 in which engage two pins firmly connected to the jaw 6 so that the cup can rock about the centre 0 only in the direction of this axis, that is to say in one plane. The transverse channel 26 whose axis is perpendicular to the channel 24 co-operates with a rod 27 which passes through the ball so that a rocking movement of the cup in relation to the ball can take place only along the axis of this channel, i.e., in a plane perpendicular to the above-mentioned plane. In order to prevent any rotational movement of the cup relative to the ball, the rod 27 is provided with two square portions 28 and 29 which engage respectively in the ball and the cup. The square head 29 which slides in the channel 26 and bears against a shoulder 30 of the channel also serves to lock the cup in position on the ball with the aid of a knurled nut 31.

Figure 2:
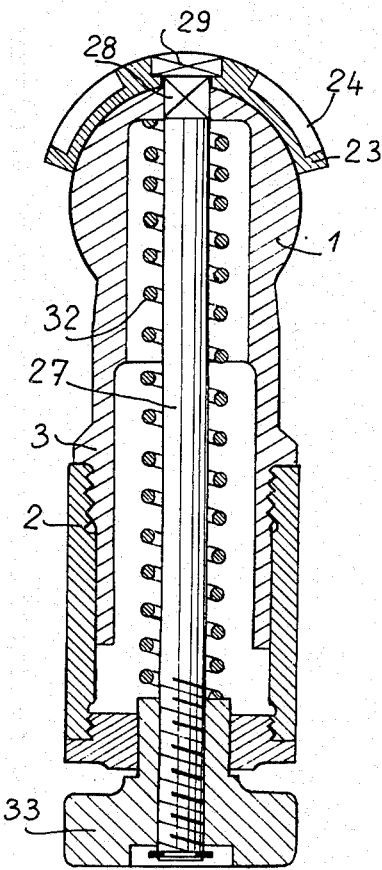
FIG. 2 illustrates in section a modification of this first construction.

In a modified arrangement (FIG. 2) the rod 27 is associated with a spring 32 which bears against the nut 33. The object of this arrangement is to apply the cup 23 to the ball under a certain amount of continuous pressure so that, since the assembly is less free to move, adjustment of the level in question is rendered easier and the locking action by means of the nut 33 is made possible.

Figure 3:
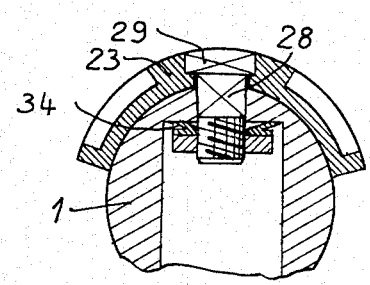
FIG. 3 is a section through part of a further modified form.
Figure 4:
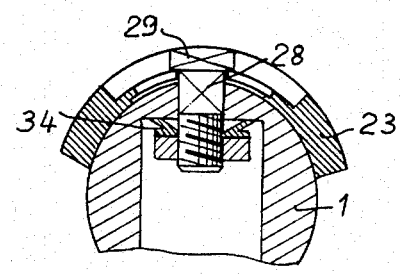
FIG. 4 is a section through the modified form illustrated in FIG. 3, but on a plane perpendicular thereto.

In another modified form (FIGS. 3 and 4), the locking means employing a nut is omitted. The rod 27 is reduced to the parts 28 and 29, and the spring 32 is replaced by a spring washer 34. In this variant, since the continuous pressure between the cup and the ball is adequate, the cup is not locked in position. The entire joint is locked by clamping the upper and lower jaws.

Figure 5:
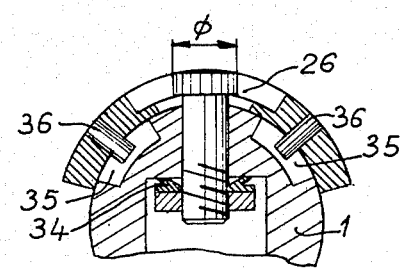
FIG. 5 is a section through another modified form.
Figure 6:
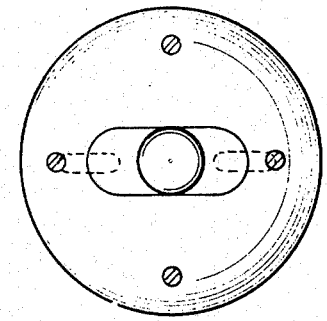
FIG. 6 is a plan view of the modified form illustrated in FIG. 5.

In the modified arrangement illustrated in FIGS. 5 and 6, the channel 26 is replaced by two channel parts 35. These are milled in the ball, and the corresponding guide means are constituted by two pins 36 firmly connected to the cup 23. It will be noted that in this arrangement the square portions 28 and 29 are no longer necessary whatever the combination of variants employed.

Figure 7:
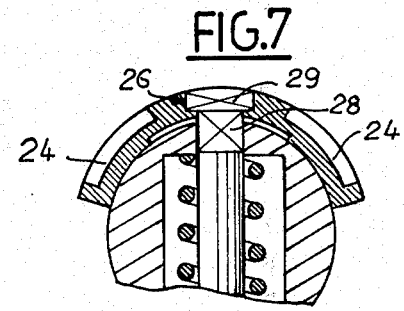
FIG. 7, 8 and 9 illustrate the mode of operation of the construction illustrated in FIG. 2.
Figure 8:
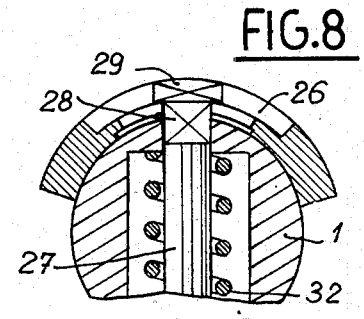
Figure 9:
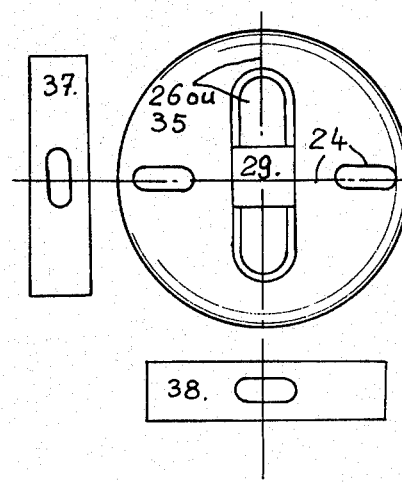

The mode of operation of the means for adjusting level with the aid of the joint described is illustrated diagrammatically in FIGS. 7 and 9. This adjustment is carried out in two stages:

1st stage

With the jaws not clamped, the assembly is rocked along the axis of the channel 26 or 35, and the effect of this is to bring the spirit level 37 into operation parallel to this axis. When the bubble is at the middle of the spirit level, the cup 23 may be locked on to the ball by the rod 4. It should be noted that no other movement is possible during this adjustment stage.

2nd stage

Adjustment of the spirit level 37 having been completed, the assembly is rocked in the other perpendicular direction along the axis of the channel 24 and this brings the spirit level 38 into operation parallel to the channel 24. When the bubble of the spirit level 38 is at the middle position, the assembly is locked by the jaws. It should be noted that during this second phase, the adjustment of the spirit level 37 cannot be affected, and that no other movement is possible, the cup either being locked on to the ball or being applied to the ball by means of the spring or the spring washers. Slight pressure in fact suffices, and the second displacement has no component in the direction of the first and thus cannot alter the first adjustment.

With this arrangement it is possible to combine all the advantages of a ball-and-socket joint with those of a cardan-type joint, that is to say permitting displacement only along two orthogonal axes.

Figure 13:
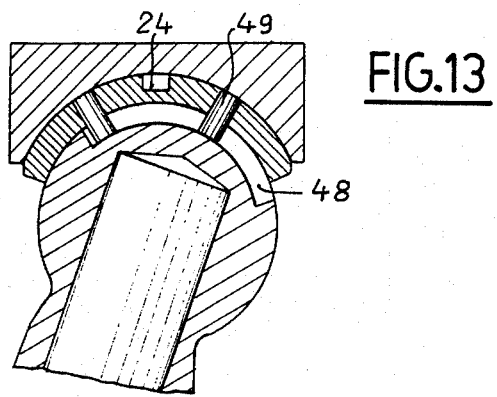
FIG. 13 shows a section through part of a modified form of the construction illustrated in FIGS. 11 and 12.
Figure 11:
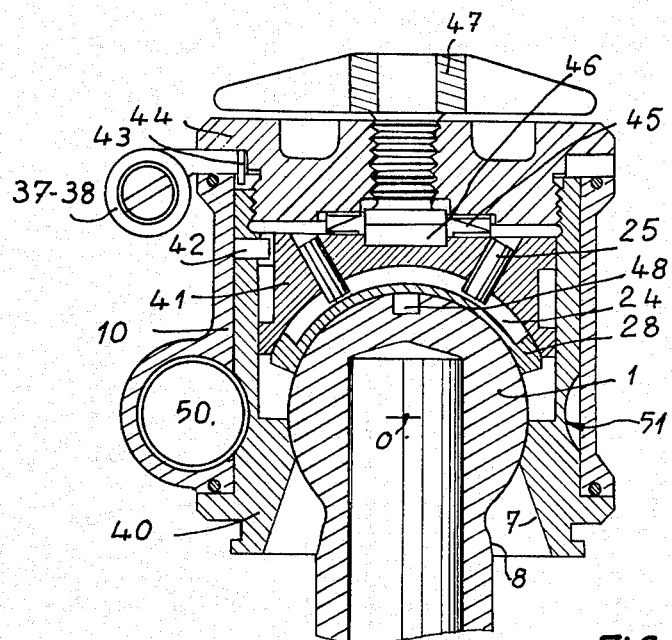
FIGS. 11 and 12 illustrate a second construction of the joint in two different positions.
Figure 12:
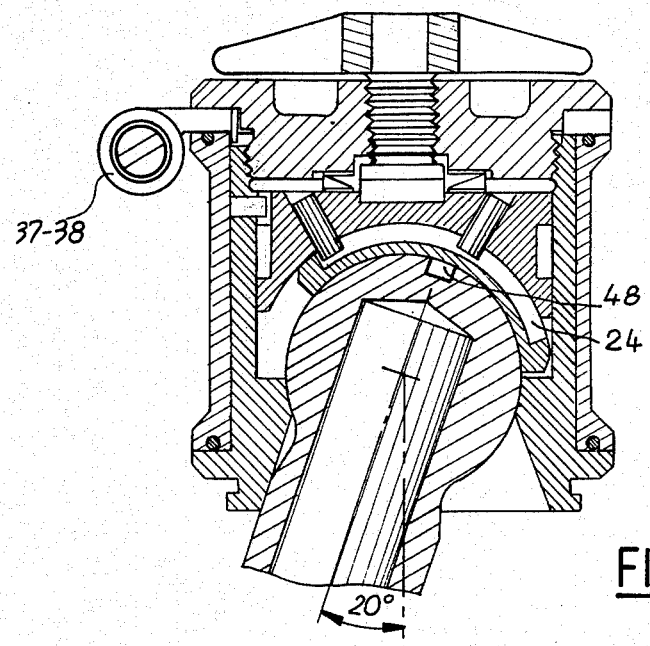

The mode of operation of the third arrangement illustrated in FIGS. 11 and 13 is identical to that of the arrangement already described, but results in a more compact, stronger and simpler construction. In this arrangement the ball-and-socket joint is arranged inside the boss of the support on which the apparatus 10 swivels.

In this arrangement, the boss 40 has a lower part forming the lower jaw. The upper jaw is here formed by a part 41 which slides in the bore of the boss 40. This part 41 is applied to the cup 48, resting on the ball 1, by a cap 44 screwed into the upper end of the boss 40 and by a spring washer 45 fitted between the part 41 and the cap 44.

To lock the ball-and-socket joint in a given position, there is provided a clamping wheel 47 which is screwed into the cap 44 and acts on the sliding part 41 through a friction lining 46. It will be seen that a peg 42 prevents any rotation of the sliding part 41.

The spirit levels 37 and 38 are positioned relatively to the joint with the aid of a peg 43 so that they are disposed parallel to the orthogonal axes of displacement of the joint.

In this arrangement the channel 24 is formed in the upper surface of the cup 28 and co-operates with guide pegs 25 fitted in the sliding part 41.

Also, the upper surface of the ball was formed therein a channel 48 disposed in a plane perpendicular to the channel 24 co-operating with guide pegs 49 secured in the cup 28 and projecting inwardly therefrom.

In the two embodiments and the modified forms thereof that have been described, the principle of this ball-and-socket joint resides in the use of an intermediate cup situated between the ball and the part complementary thereto. This cup comprises guide means which permit only two distinct and mutually independent movements relative to the cradle. Locking ensures that the assembly remains rigid once the required position has been set. The two guides are disposed at an angular distance of 90° from each other. The rocking movements take place on two precisely defined planes.

This joint appears to be particularly suitable for use on a tripod mounting adapted to accommodate rocket-launching tubes or a non-recoiling weapon, these being types of weapon that are not subjected to any great reactions or forces in their mountings.

The advantages resulting from this construction are:
speed of adjustment,
mechanical simplicity,
strength,
low weight,
compactness, and
ease of manufacture and assembly.

It is obvious that in the modified forms the channel 24 can be machined either in the upper jaw 6 or in the sliding part 41, the corresponding pegs 25 then being carried by the cup 28. The same applies as regards the guide means provided between this cup 28 and the ball 1.

Figure 14:
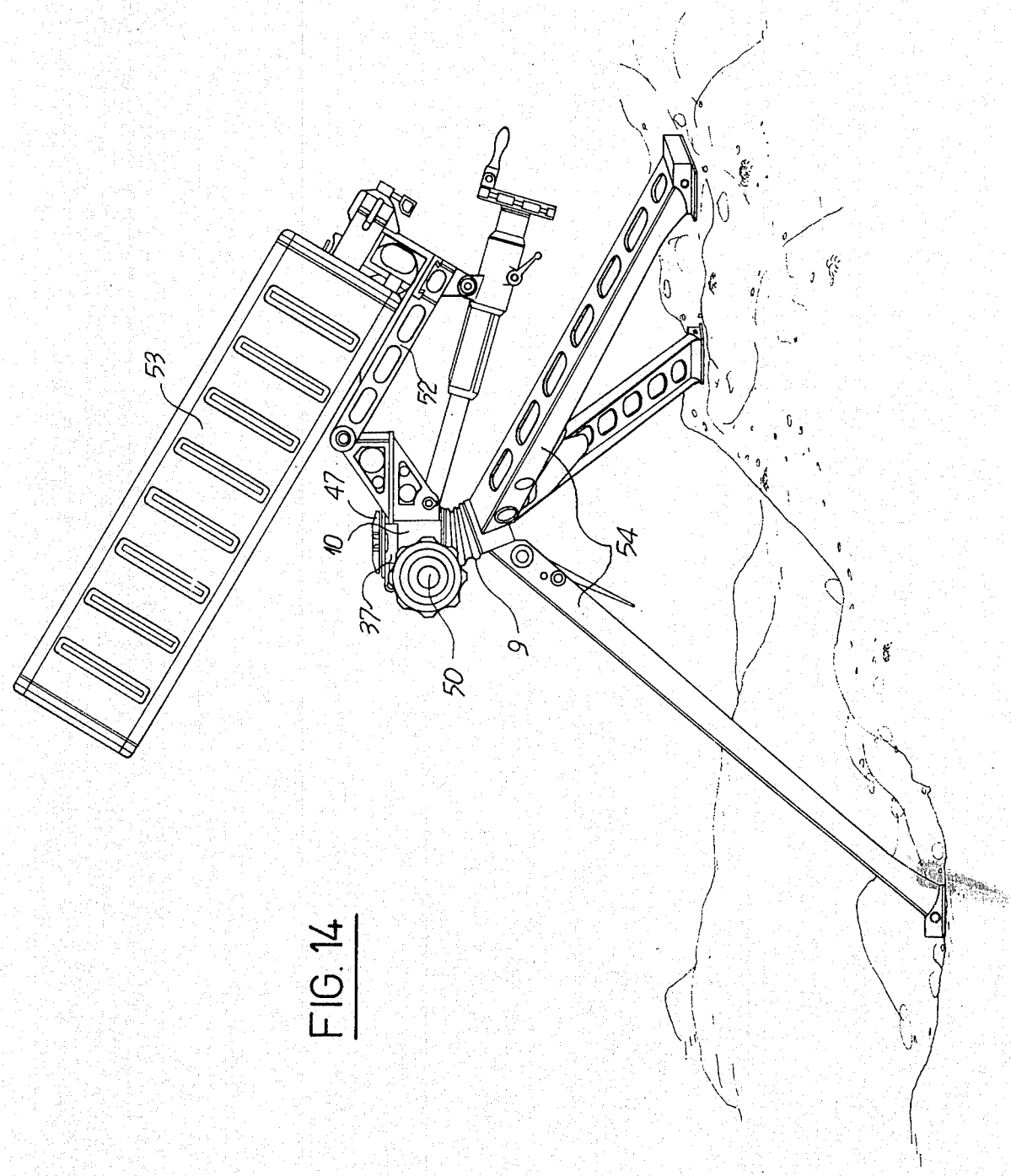
FIG. 14 illustrates a particular use of the ball-and-socket joint.

FIG. 14 illustrates a particular use of the ball-and-socket joint described. The joint is here used for mounting a support 52 designed to carry, on a tripod 54, magazines 53 containing self-propelled projectiles. This ball-and-socket joint enables the equipment to be set at the required level very easily, aiming and adjustment of direction being carried out separately at a later stage.

It should be pointed out that all the arrangements that have been described comprise, for the purpose of adjusting the direction of the bearing element of the apparatus 10, a drive means incorporating a worm gear 50 meshing with a gear wheel 51 disposed tangentially thereof and formed in the cylindrical wall of the shaft 11 of the bearing element.

I claim:

1. A ball-and-socket joint comprising an upper jaw and a lower jaw, one arranged on one side of a median plane of a ball, and the other disposed on the other side of said plane, and a means for clamping these jaws to lock the joint in a required position, characterized in that it comprises: a part-spherical cup disposed between the upper jaw and the ball; a first guide means limiting displacement of this cup relatively to the upper jaw in a first central plane of symmetry of the ball; and a second guide means limiting displacement of this cup relatively to the ball in a second central plane of symmetry of the ball, and in that this first and second plane of symmetry are at right-angles to each other.

2. A joint according to claim 1 characterizeed in that when the means for clamping the jaws is relaxed, these jaws form a spherical seat for the ball.

3. A joint according to claim 2, characterized in that the ball constitutes the end of a stem extending through the lower jaw, and in that the diameter of the stem is less than that of the ball.

4. A joint according to claim 1, characterized in that the first guide means comprise at least one channel formed in the exterior surface of the cup and extending along a portion of the great circle thereof, and guide elements firmly connected to the upper jaw and projecting therefrom into said channel.

5. A joint according to claim 4, characterized in that the cup has formed therein two channels situated on the same great circle and each co-operating with a guide element secured in the upper jaw.

6. A joint according to claim 1, characterized in that the second guide means comprises a traversing channel formed in the cup and extending along a great circle thereof, perpendicular to the channels of the first guide means, and a guide element immobilized in relation to the ball and traversing this channel.

7. A joint according to claim 6, characterized in that this guide element is subjected to a resilient action whereby the cup is urged against the ball, the head of this guide element bearing on a shoulder of the traversing channel.

8. A joint according to claim 6, characterized in that this guide element is formed by a peg which traverses the ball and the stem and whose one end is screwed into a clamping element enabling the cup to be locked on to the ball.

9. A joint according to claim 1, characterized in that the first guide means comprise at least one channel formed along a great circle of the inner surface of the upper jaw, and a guide element firmly secured to the cup and projecting therefrom into each channel.

10. A joint according to claim 1, characterized in that the second guide means comprise at least one channel formed in the surface of the ball on a great circle thereof, and guide elements firmly connected to the cup and projecting therefrom into each channel.

11. A joint according to claim 1, characterized in that the second guide means comprise at least one channel formed in the inner surface of the cup and on a great circle thereof, guide elements projecting from the ball engaging in said channel.

12. A joint according to claim 1, characterized in that the lower jaw is integral with a case surrounding the ball and enclosing both the cup and the upper jaw.

13. A joint according to claim 12 characterized in that this case has a screw-on cover.

14. A joint according to claim 13 characterized in that a screw is screwed into a tapped thread extending through this cover, that end of the screw located in the case making contact with the upper jaw by way of a friction lining, and tightening of the screw resulting in the joint being locked in position.

15. A joint according to claim 1 characterized in that the upper jaw forms the shaft of the bearing element, and in that a worm wheel, disposed tangentially of this shaft, is cut in the cylindrical wall of this shaft, the wheel being adapted to mesh with a worm gear fitted in the body of the bearing element.

* * * * *